United States Patent Office 2,768,993
Patented Oct. 30, 1956

2,768,993

COATING COMPOSITION AND ARTICLE

Folsom E. Drummond, Washington, D. C., assignor to Midland Chemical Corporation, Dayton, Ohio, a corporation of Delaware No Drawing. Application May 14, 1953,
Serial No. 355,169

2 Claims. (Cl. 260—37)

This invention relates to improvements in coating compositions and more particularly to coating compositions which are adapted to be applied to metal surfaces and form a film thereover containing principally corrosion-resistant metal particles for protecting the surface against corrosion.

The coating compositions of this invention comprise essentially finely divided particles of metallic zinc or zinc alloys that are suspended in a vehicle and which are adapted to be applied to metal surfaces by spraying, dipping, brushing, roll coating or the like, and thereafter air dried or baked at suitable temperatures to produce a hard, tenacious coating film thereover which is resistant to abrasion and corrosion.

It has been known heretofore to prepare coating compositions utilizing pigments with a binder such as alkali metal silicates and the like, the coating compositions being applied to metal surfaces and then baked to produce a protective coating film thereon. While such coating compositions, particularly those containing finely divided metal oxides provide useful protective coatings for metal surfaces, they have the disadvantage that due to the tendency of the materials to react the concentration of the alkali metal silicate must be carefully controlled since the use of highly concentrated alkali metal silicate solutions causes a reaction to take place with evolution of gases. This results in the formation of blisters in the coating film which is, of course, undesirable. It is an object of this invention to overcome these drawbacks and to provide an abrasion-resistant resinous type coating having improved resistance to corrosion.

Another object of the invention is to provide a coating composition of the resinous bonded-powdered metal type in which zinc metal is the principal constituent, the coating composition being applied to metal or other surfaces and baked to form a tenacious, corrosion-resistant film thereon.

It is a further object of this invention to provide a liquid coating composition and method for coating metal and the like surfaces whereby a protective film of zinc metal particles is caused to firmly adhere to the surface forming a coating thereover which is resistant to abrasion and atmospheric conditions conducive to corrosion.

These and other objects and advantages of the invention will become apparent from the following description and wherein typical examples of the composition and method of application are set forth.

The coating compositions compounded in accordance with this invention comprise a mixture of zinc metal dust and a resinous vehicle for bonding the metal together and to the surface of the metal. The resinous material preferably comprises an organic-silicon compound, such as organopolysiloxane dissolved in a suitable solvent. To further enhance the endurance a corrosion inhibitor may be incorporated.

The resinous vehicle or binder for the metal particles may comprise an alkoxy-silicon halide compound in concentrated form or dissolved in a volatile organic solvent such as benzene, toluene, carbon tetrachloride, tetrachloroethylene or the like. Alkoxy-silicones or mixtures thereof which may be used are such as those described in the U. S. Patents 2,462,242, 2,469,625 and 2,470,593. As a corrosion inhibitor a small amount of a polyamine such as described in the U. S. Patent 2,598,213 is preferably incorporated.

Metal surfaces to be treated are chemically cleaned to remove grease and/or foreign matter and then coated with a thin film or layer of the organo-silicon vehicle containing ultrafine metal particles of zinc or zinc alloy. To obtain a hard film the silicone may be polymerized by heating to from 200 to 400° F. as described in U. S. Patent 2,258,218.

Compositions illustrative of the silicone resin solution and corrosion inhibitor are as follows:

*Example I*

A silicone resin solution is made up comprising phenyl ethyl polysiloxans as follows:

| | Parts by weight |
|---|---|
| Dow-Corning Resin 992 (Phenyl:ethyl:silicone mol ratio of about 0.77:0.43:1) | 15 |
| Tetrachloroethylene | 85 |

*Example II*

Corrosion inhibitor solution:

| | Parts by weight |
|---|---|
| Dipropylene triamine | 5 |
| Methylethyl ketone | 100 |

Typical coating compositions which include the metal particles and resinous silicone vehicle are as follows:

*Example III*

| | Parts by weight |
|---|---|
| Silicone resin solution (Example I) | 20 to 40 |
| Zinc metal powder (300 mesh) | 80 to 120 |
| Corrosion inhibitor (Example II) | 0.5–2 |

*Example IV*

| | Parts by weight |
|---|---|
| Silicone resin solution (Example I) | 20 to 30 |
| Zinc metal powder (bulk passing 300 mesh) | 80 to 100 |
| Lead chromate | 5 to 10 |
| Corrosion inhibitor | None |

*Example V*

| | Parts by weight |
|---|---|
| Silicone resin solution (Example I) | 30 to 50 |
| Zinc metal powder (bulk passing 300 mesh) | 70 to 100 |

*Example VI*

| | Parts by weight |
|---|---|
| Silicone resin solution (Example I) | 20 to 50 |
| Zinc alloy metal powder—1 to 3% aluminum, 2 to 5% chromium, the remainder substantially all zinc | 60 to 130 |
| Corrosion inhibitor (Example II) | 0.5–2 |

Where it is desired that the coating possess fire resistant properties, a vehicle comprising polyhalogenated silicones are particularly useful. Examples of such silicones are described in the U. S. patents to Hersh 2,464,231 and 2,615,033.

An example illustrating this type of composition which is both corrosion resistant and fire resisting is as follows:

*Example VII*

| | Parts by weight |
|---|---|
| Silicone resin (cyclo-pentamethylene-silicon dichloride) | 20 to 50 |
| Zinc metal powder (bulk passing 300 mesh) | 70 to 120 |

The silicone resin in Example VII is a clear liquid having a B. P. of 165–175° C. at normal atmospheric pressure. Where it is desired to reduce the viscosity of the resin or composition, suitable solvents such as aforementioned may be added.

The above coating compositions may be applied to metal surfaces by spraying, brushing or flow coating, as by dipping the metal article in a tank containing the liquid coating composition, and thereafter baking the coating from 1½ to 2 hours at a temperature between about 150 and 300° F. to volatize the solvent and form a tough adherent film on the metal surface.

Other suitable organo-silicones may be employed, for example, a dimethyl silicone having a R/Si ratio of approximately 1.68 to 1 and which may be prepared by hydrolyzing dimethyldichlorosilane or its esters, and oxidizing with a catalyst to obtain the desired $CH_3/Si$ ratio. The organo-silicone resin or mixture of silicone resins used may be varied, depending upon the metal being coated and the type of application.

Various organic solvents may be used or suitable mixtures thereof to make a free flowing liquid coating silicone composition of the desired viscosity. For example, the silicone may be dissolved in ethers, esters, hydrocarbons such as trichloroethylene, butyl ether, isopropyl ether, diethyl oxalate, amyl acetate, methyl hexyl ketone, cyclohexanone, xylene, cyclohexane, toluene and the like.

Silicone resinous films exhibit a high resistance to attack by corrosive salt solutions and the like, and this property is further enhanced by the presence of finely divided oxidation resistant zinc metal or metal alloy particles. The addition of a basis polyamine containing two or more amino nitrogen atoms functions to further improve the corrosion resistant properties of the zinc metal-silicone coating compositions of this invention. While it is preferred to incorporate a small effective amount of the amino compound it may be omitted, as illustrated in Examples IV and V, and VII.

Examples of other polyamine corrosion inhibitors, which may also be used if desired, are as follows: propylene diamine, 1,3 diamino butane, monostearyl triethylene tetramine and the like amines. The amines are dissolved in a suitable solvent, such as methyl ethyl ketone, xylene, kerosene, etc. to provide a solution of the polyamine, which is then added in small amounts to the silicone or solvent mixture thereof.

The zinc metal particles are of relatively small size, preferably ultrafine particles and uniformly distributed throughout the silicone coating film.

To vary the color of the above compositions, a portion of the zinc metal or zinc metal alloy may be substituted by a color pigments, such as the oxides and carbonates of lead, zinc, titanium and the like. Organic dyes also may be incorporated for a part of the zinc metal. An example illustrative of such a modified composition is as follows:

*Example VIII*

| | Parts by weight |
|---|---|
| Titanium oxide | 5 to 25 |
| Zinc metal powder (300+ mesh) | 10 to 120 |
| 10% solution of di-methylsilicone (R/Si less than 2) dissolved in a 1:1 mixture of cyclohexane and isopropyl ether | 10 to 80 |

The compositions of the invention may be made up by suitably mixing the zinc metal powder and pigments, if any, with the silicone resinous vehicle using a pony mixer or the like. A burr mill or roller mill, such as utilized in the paint industry, however, may be used, if desired, to incorporate the zinc metal powder with the liquid vehicle. Where additions of pigments such as carbon or lamp blacks and the like are desired, the pigment is ground in a portion of the liquid vehicle forming a paste. A ball mill may also be used to disperse the metal and pigment particles in the vehicle and form a paste. The paste thus formed is then incorporated with the remaining ingredients to produce a finished product.

The zinc metal powder preferably comprises particles of which approximately 80% passes a 300 inch, or finer, mesh sieve, the remainder passing at least 200 inch screen. The zinc metal may be obtained from any suitable source and may be produced by different processes.

The zinc metal may be substantially pure metal or contain 1 to 15% of alloy metals.

The silicon resinous compounds utilized in the compositions of this invention generally are those capable of being polymerized. The basic structural unit having the general formula

where R and $R_1$ each may be alkyl, alkenyl, aryl, aroxyaryl or other organic radicals both saturated and unsaturated or oxygen.

Other particulate metals with or without zinc may be used such as titanium, zirconium, lithium, magnesium, aluminum and the like. Further, the relative proportions of silicone resin and metal particles and any inert filler constituents may be rather widely varied depending upon the purpose for which the composition is intended and the results to be obtained. When the composition is to be used as a corrosion resistant protective coating, a relatively large proportionate amount of metallic powder or dust generally is found desirable.

Although an alloy of zinc with chromium and aluminum is set out in an example illustrating the invention, it will be understood that other alloys of zinc may be employed. Zinc alloyed with up to 15% of other metals, e. g. molybdenum, tungsten, nickel, vanadium, copper or iron are illustrative of alloys which may also be used.

The term "zinc metal" as used in the specification and claims is intended to include alloys of zinc with other metals, and wherein zinc metal constitutes the major constituent of the metal or alloy.

I claim:

1. A coating composition for application to metal surfaces to provide the same with both a corrosion and fire resistant coating, said coating composition comprising cyclopentamethylene silicon dichloride resin and finely divided particles of metallic zinc.

2. A coating composition for application to metal surfaces to provide the same with both a corrosion and fire resistant coating, said coating composition comprising 20 to 50 parts by weight of cyclopentamethylene silicon dichloride resin and 70 to 120 parts by weight of finely divided particles of metallic zinc.

References Cited in the file of this patent

UNITED STATES PATENTS

| 2,464,231 | Hersh | Mar. 15, 1949 |
| 2,568,189 | Fisher | Sept. 18, 1951 |
| 2,598,213 | Blair | May 27, 1952 |
| 2,605,194 | Smith | July 29, 1952 |

OTHER REFERENCES

Barton: Industrial Finishing (London) 3, 543–4, 546, 548–50, 552 (1951), reported in Chemical Abstracts 45, 5090f (1951).